United States Patent [19]

Ueda

[11] Patent Number: 4,518,906
[45] Date of Patent: May 21, 1985

[54] DRIVING DEVICE OF STEPPING MOTOR

[75] Inventor: Makoto Ueda, Tokyo, Japan

[73] Assignee: Seiko Instruments & Electronics Ltd., Tokyo, Japan

[21] Appl. No.: 327,234

[22] Filed: Dec. 3, 1981

[30] Foreign Application Priority Data

Dec. 18, 1980 [JP] Japan ................. 55-179504

[51] Int. Cl.³ .............. G04B 19/00; G04C 3/00; G05B 19/40
[52] U.S. Cl. .................. 318/696; 368/86; 368/218
[58] Field of Search ........ 318/696; 368/157, 217–219, 368/80, 76, 56–58, 52, 85–87

[56] References Cited

U.S. PATENT DOCUMENTS 4,219,999 9/1980 Ichikawa ................. 368/80 X
4,283,783 8/1981 Nakajima ................. 368/218 X
4,321,521 3/1982 Ueda ..................... 318/696
4,326,278 4/1982 Shida .................... 318/696 X Primary Examiner—Stanley J. Witkowski
Assistant Examiner—Patrick C. Keane
Attorney, Agent, or Firm—Robert E. Burns; Emmanuel J. Lobato; Bruce L. Adams

[57] ABSTRACT

A driving device of a stepping motor comprises a driver/detector circuit for detecting whether a rotor has rotated or not by comparing a voltage induced across a driving coil by the free oscillation of the rotor with a reference voltage after a driving pulse is cut off and a control circuit automatically varies the pulse width of the driving pulse in response to an output of the driver/detector circuit. The control circuit includes circuitry for lowering the reference voltage when the pulse width of the driving pulse is lengthened thereby enabling use of a wider range of driving pulse widths than would otherwise be possible.

7 Claims, 15 Drawing Figures

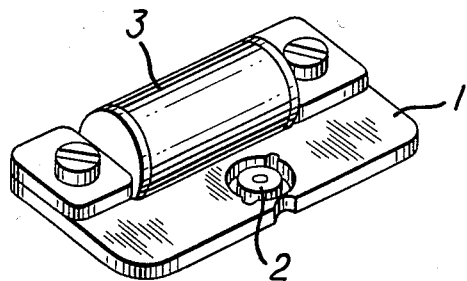
FIG. I(A) PRIOR ART
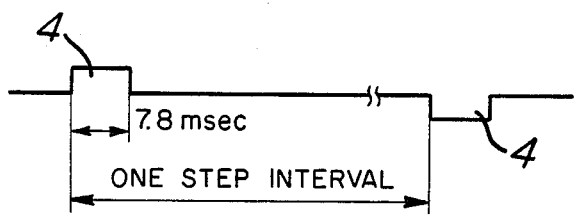
FIG. I(B) PRIOR ART
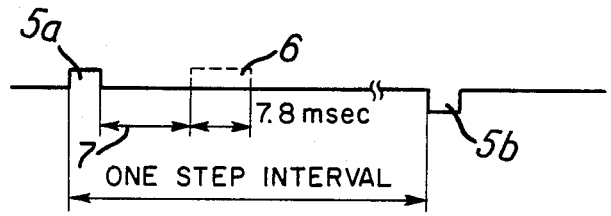
FIG. I(C) PRIOR ART
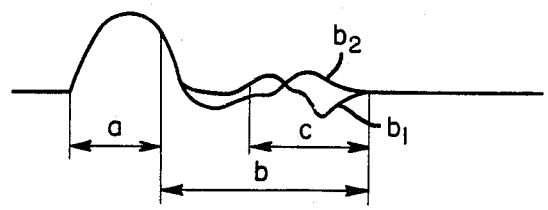
FIG. I(D) PRIOR ART

4,518,906

DRIVING DEVICE OF STEPPING MOTOR

BACKGROUND OF THE INVENTION

The present invention relates to a driving device of a stepping motor for improving the operating stability of the stepping motor and for eliminating mis-detection of a driver/detector which detects whether or not the motor rotor has rotated.

FIG. 1(A) shows a structure for a conventional stepping motor. Reference numeral 1 denotes a stator, 2 denotes a rotor consisting of a magnet magnetized in the diametrical direction and 3 denotes a coil.

FIG. 1(B) shows a normal driving pulse 4 which is used to drive the stepping motor. The pulse is applied across the coil 3. The pulse 4 is an alternating pulse having a pulse width of 7.8 msec which guarantees a sufficient output torque for rotating the rotor. Namely the stepping motor does not stop rotating even if the load applied thereto varies and increases.

FIG. 1(C) shows an improved driving method over that shown in FIG. 1(B) and shows what is called a correction driving method. This is an automatic control method which produces a driving pulse width in accordance with the amount of load applied to the stepping motor to thereby reduce the overall current consumption. Reference numerals 5a and 5b are normal driving pulses whose pulse widths are automatically changed in the range of 2.4 msec to 3.9 msec in response to changes in the motor load or the supply voltage. Reference numeral 7 denotes an interval to detect rotation of the rotor 2. A detector (not shown) detects whether the rotor has rotated or not by detecting a voltage induced across the coil 3 by the free oscillation of the rotor 2 after the stepping motor is driven by the normal driving pulse 5a. Reference numeral 6 denotes a correction pulse produced only when the rotor 2 has not rotated by the normal driving pulses 5a and 5b. The correction pulse width has a pulse width of 7.8 msec, which is sufficient to rotate the stepping motor under any load.

FIG. 1(D) shows current waveforms observed in the coil of the stepping motor. An interval "a" denotes a driving pulse width, and an interval "b" denotes a current flowing interval by the voltage induced by the free oscillation of the rotor after the stepping motor is driven by the driving pulse a. The reference character $b_1$ denotes a waveform in the case the rotor has rotated by the driving pulse "a", and $b_2$ denotes a waveform in the case the rotor has not rotated. The rotor rotation or non-rotation is detected at an interval "c" during which the characteristic features of both the waveforms $b_1$ and $b_2$ are identified. For easy detection, the induced voltage is amplified.

The above-mentioned correction driving method and the amplification of the induced voltage are disclosed in U.S. Pat. No. 4,326,278 in detail.

FIG. 2 shows an embodiment of the driver/detector circuitry which is conventionally utilized. The structure of the detector will only be briefly illustrated as it is illustrated in detail in U.S. Pat. No. 4,326,278. Terminals Out 1 and Out 2 are connected to the coil 3. A voltage induced by the free oscillation of the rotor appears at resistors 105 or 106 after the application of the drive pulse. The voltage is fed to comparators 109 or 110 to be compared with a reference voltage determined by resistors 112 and 113. A voltage higher than the reference voltage is present at the resistors 105 or 106 when the rotor has rotated, so that an output "H" is present at a detection output terminal 121. While there is no problem when a normal driving pulse width is short, the induced voltage is lowered when the normal driving pulse width is prolonged to some extent. For example, when a driving pulse having a pulse width of more than 4 msec in width is applied to the stepping motor which can be driven by a pulse around 2.4 msec in width, the detection voltage is gradually lowered and becomes lower than the reference voltage determined by the resistors 112 and 113. As a result, the detector judges that the stepping motor is not rotating although it actually is rotating. Namely, as the driving pulse width is prolonged, the stepping motor rotates to the rest position during the period while the driving pulse is applied, whereby the free oscillation of the rotor after the application of the driving pulse tends to be reduced and the induced voltage is lowered. Therefore a pulse of more than 4 msec in width could not be used conventionally in the correction driving method. Accordingly, it is necessary to drive the stepping motor by the correction pulse 7.8 msec in width when it has not rotated by the normal driving pulse 4 msec in width, and as a result, it has been difficult to drive the stepping motor at low power consumption.

The present invention aims to eliminate the above noted drawbacks, and therefore it is an object of the present invention to provide a driving device able to cope with a wide range of driving pulse widths.

Although the driving device is not suitable for high-speed rotating instruments, it is effective when low-power operation is required under the conditions that the step rotation interval is several tens msec and the load variation is large. Further, it is most suitable for use in electronic watches since the particular detection elements are not needed and the whole circuits are composed of the C-MOS IC. The embodiment of the present invention will be illustrated taking the application for watches by way of exapmle.

A stepping motor according to an embodiment of the present invention comprises a coil 3 having 8000 turns of wire of diameter 20μ, a rotor 2 with a diameter of 1.3 mm made of samarium cobalt, and a stator 1 made of 78 permalloy. A power source comprises a silver cell of 1.57 volts. A reference signal source is a quartz crystal of 32768 Hz, and an oscillating circuit, a control circuit and the like are incorporated into a single C-MOS IC chip.

BRIEF DESCRIPTION OF THE DRAWINGS

FIG. 1(A) shows a perspective view, FIG. 1(B) shows a waveform of a driving pulse, FIG. 1(C) shows a waveform of a correction pulse and FIG. 1(D) shows current waveforms of the conventional stepping motor, FIG. 4 shows correlation diagrams between the rotor movement and the pulses applied thereto, in which

FIG. 3 shows a block diagram of the present invention, in which reference numeral 8 denotes a control circuit and 9 denotes a driver/detector. Pulses $P_{a0}$, $P_{a1}$, $P_{a2}$, $P_{a3}$, $P_{a4}$, $P_{a5}$, $P_s$ and $P_{D2}$ are fed to the control circuit 8 every one second, and signals 11, 12, 13, 14, 15, 16, $P_s$ and $P_t$ are produced from the control circuit 8 and fed to the driver/detector 9. Output Out 1 and Out 2 are produced from the driver/detector 9 and applied to a stepping motor 10. A detection signal $D_s$ is produced only when the stepping motor has rotated and fed back to the control circuit 8.

The principle of the present invention will be briefly illustrated before providing the detailed description thereof.

Figure 4A:
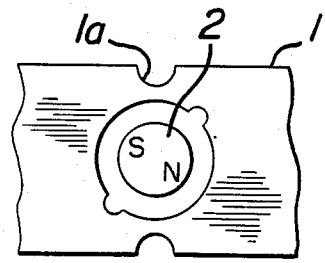
FIG. 4(A) shows the rest condition of the rotor without applying the pulses.
Figure 4C:
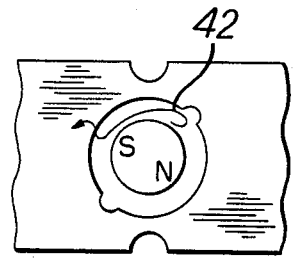
FIG. 4(C) shows the condition that the rotor has not rotated because of a large load.
Figure 4B:
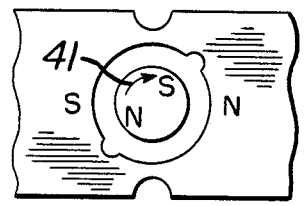
FIG. 4(B) shows the condition that the normal driving pulse is applied.

FIG. 4(A) shows the positional relationship between the stator 1 and the rotor 2 of the stepping motor. Since the stator 1 is of one piece the, two poles of the stator are connected via a pair of saturable portions, 1a and the rotor 2 is in the rest position which is decided by notches provided at the inner periphery of the stator 1. When a current is flown through the coil 3, the stator is magnetized as shown in FIG. 4(B).

Figure 4D:
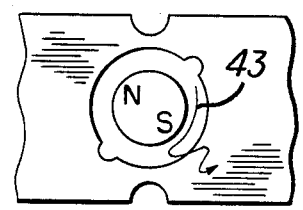
FIG. 4(D) shows the rotating condition of the rotor.

Magnetic poles S of the stator and the rotor and the magnetics poles N of the stator and rotor repel each other to rotate the rotor as shown by an arrow mark 41. If the rotor fails to rotate one step because of the short applied pulse width, it oscillates and stops at its previous rest position as shown by an arrow mark 42 in FIG. 4(C). If the applied pulse width is sufficiently long to rotate the rotor one step, however, the rotor rotates through an increment of 180° and oscillates as shown by an arrow mark 43 in FIG. 4(D). Since the oscillation of the rotor on this occasion is larger than the case when the rotor has not rotated, the rotation of the rotor can be detected by detecting the voltage induced by the free oscillation of the rotor.

As the driving pulse width is made longer, however, the rotor almost rotates to the destined position while the driving pulse is still being applied, and the oscillation of the rotor after the application of the pulse tends to be smaller. Therefore, the reference voltage for determining whether the rotor has rotated or not can be lowered when the driving pulse width is longer, whereby the driving pulse width can be changed over a wider range than possible in the conventional type.

Figure 5:
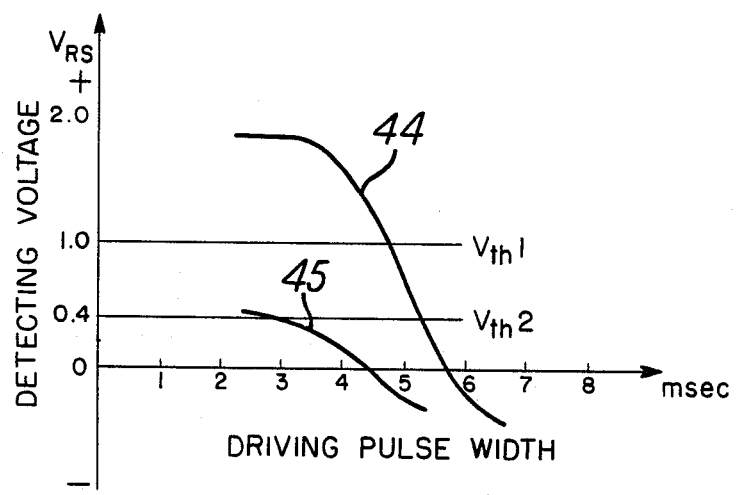
FIG. 5 shows voltages induced by the rotor in both the rotating condition and the non-rotating condition when the pulse width of the normal driving pulse is changed.

FIG. 5 is a graph showing the detection voltage change in the case the driving pulse width is changed. The detection voltage shown in the graph is not the value of the induced voltage itself but the value suitably amplified by an amplifier.

Reference numeral 44 denotes a detection voltage in the case the rotor has rotated and 45 denotes the same in the case the rotor has not rotated. To distinguish between both the rotation and non-rotation detection voltages, the reference voltage of detection $V_{th}1$ is set at 1.0 volt when the driving pulse width is less than 4 msec, and the reference voltage of detection $V_{th}2$ is set at 0.4 volts when the driving pulse width is between 4 msec and 5 msec. Consequently driving pulses having a wider pulse width can be used in comparison with the conventional case in which a single reference voltage is used.

Subsequently, the structure of the circuits of the present invention will be illustrated, where the circuits are referred to as follows: Nor gate=NOR, Nand gate=NAND, or gate=OR, And gate=AND, Exclusive or gate=EX.OR, Flipflop=FF, N channel MOS.FET=N.MOS, P channel MOS.FET=P.MOS.

Figure 2:
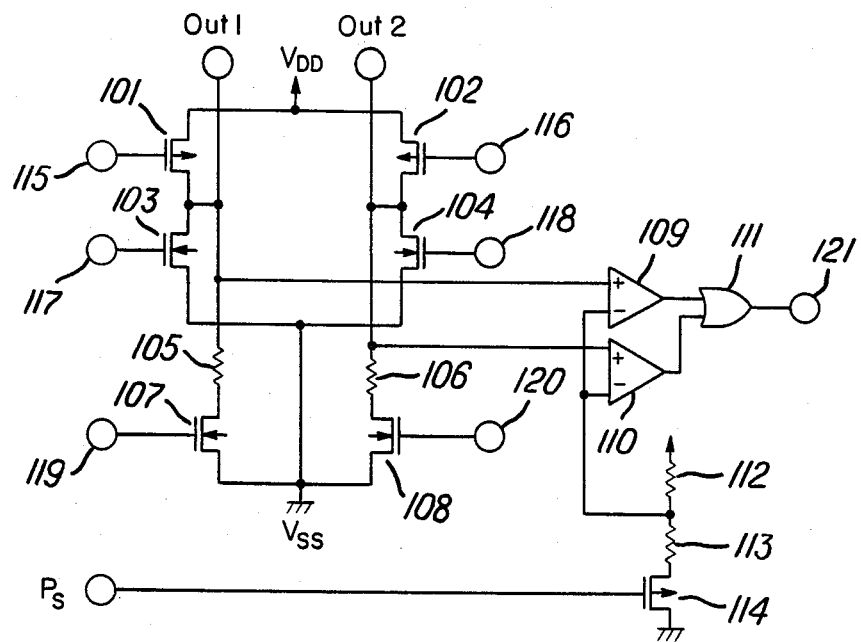
FIG. 2 shows a circuit diagram of the conventional driver/detector.
Figure 3:
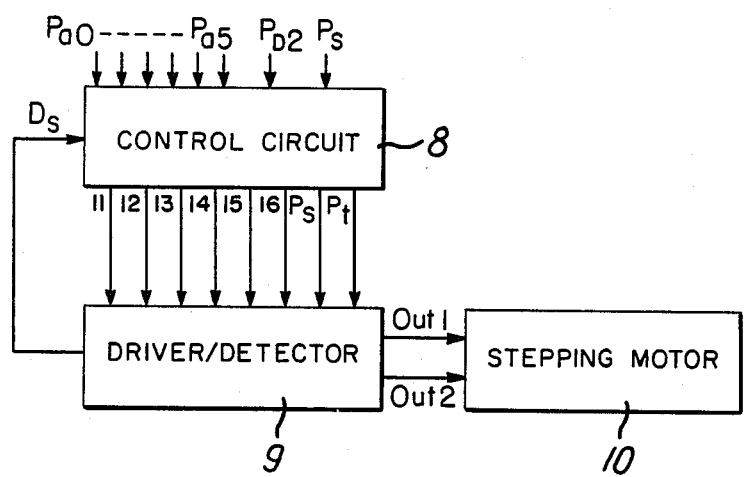
FIG. 3 shows a block diagram according to the present invention.
Figure 6:
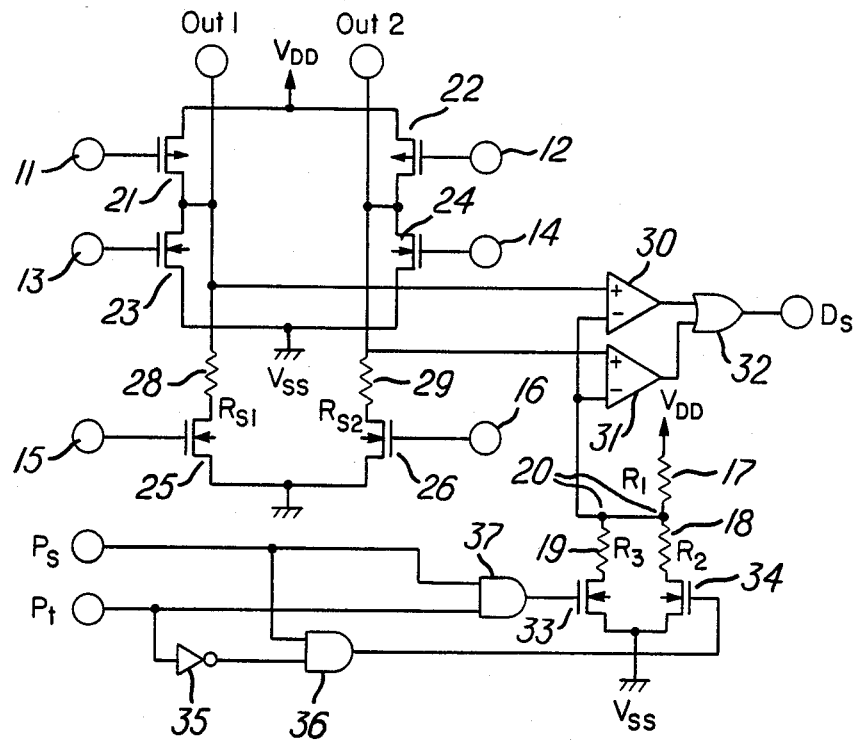
FIG. 6 shows a circuit diagram of the driver/detector.

FIG. 6 is a detailed view of the driver/detector circuits 9 shown in the block diagram of FIG. 3. A low level signal "L" is produced at a terminal $P_t$ when the driving pulse less than 4 msec in width is used. Under the circumstances, when an "H" level signal is applied to a terminal $P_s$, the output from an AND 36 is "H" and an N MOS 34 is ON. As result, a current flows through an $R_1$ resistance of resistor 17, and $R_2$ resistance of resistor 18 and the N MOS 34, and the first reference electric potential represented by $V_{th}1=[R_2/(R_1+R_2)]\times(V_{DD}-V_{ss})$ is present at a junction point 20 between the $R_1$ resistance of resistor 17 and the $R_2$ resistance of resistor 18 (where an ON resistance of the N MOS 34 is neglected). Since $(V_{DD}-V_{ss})=1.57$ volts, the ratio of the resistances $R_1$ to $R_2$ to make $V_{th}1=1.0$ V is decided by these equations.

An "H" signal is produced at the terminal $P_t$ when the driving pulse of more than 4 msec in width is used. Under the circumstances, when the "H" signal is applied to the terminal $P_s$, the output from an AND 37 is "H" and an N MOS 33 is ON. This time a current flows through a circuit consisting of the $R_1$ resistance of resistor 17, an $R_3$ resistance of resistor 19 and the N MOS 33, and the second reference electric potential represented by $V_{th}2=[R_3/(R_1+R_3)](V_{DD}-V_{ss})$ is developed at the junction point 20 between the $R_1$ resistance of resistor 17 and the $R_3$ resistance of resistor 19. Wherein the $R_1$ resistance is the value set in the case the first reference electric potential is decided. By this equation the $R_3$ resistance of resistor 19 is set so that $V_{th}2=0.4$ V.

The coil of the stepping motor is connected to the terminals Out 1 and Out 2. The voltage induced by the oscillation of the rotor during the detecting time interval is present at the terminal Out 1 or Out 2 and fed to comparators 30 or 31 to be compared with the reference voltage. The output from the comparator is fed as an output detection signal to a detection signal terminal $D_s$ via an OR 32.

P MOSes 21 and 22 and N MOSes 23 and 24 are driving transistors which are controlled to be turned on and off by the signals fed to terminals 11, 12, 13 and 14.

Figure 7:
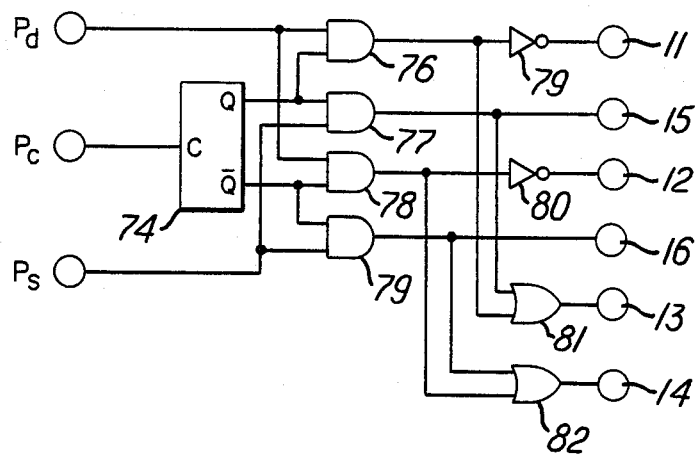
FIG. 7 shows a circuit diagram of a part of the control circuit.

FIG. 7 is a part of the control circuit 8 in the block diagram of FIG. 3. When an "H" signal is fed to a terminal $P_d$, the driving transistors are controlled to flow the current in the stepping motor. The direction of the current in the coil is controlled by an FF74. Therefore a control signal is fed to a terminal $P_c$ every 1 step of driving of the stepping motor.

Figure 8:
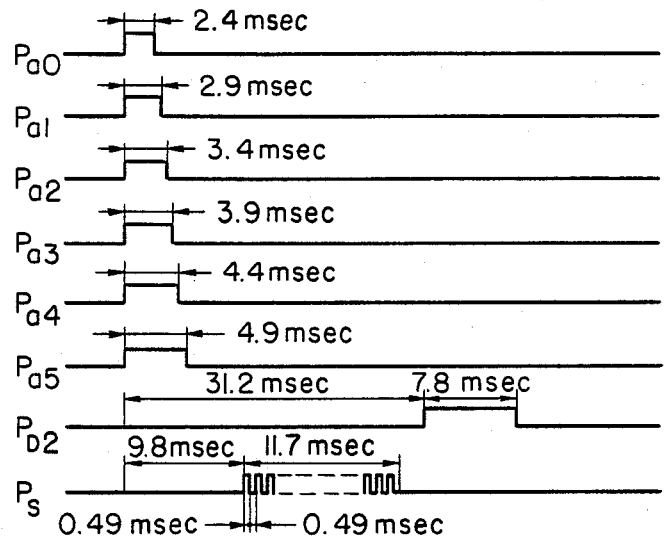
FIG. 8 shows a time chart diagram of the pulses fed to the control circuit.

FIG. 8 shows the pulses fed to the control circuit. $P_{a0}$, $P_{a1}$, $P_{a2}$, $P_{a3}$, $P_{a4}$ and $P_{a5}$ are the normal driving pulses one of which is automatically selected according to the loads applied to the stepping motor. $PD_2$ is the correction driving pulse to be applied additionally when the rotor has not rotated by the normal driving pulse. All the pulses shown in FIG. 8 are synchronized with the 1 step rotation period of the stepping motor.

The pulse $P_s$ effects the connection of a low resistance loop and a high resistance loop to both ends of the coil alternately to amplify the voltage induced in the coil. The pulse $P_s$ switches over a loop shorted by the N MOSes 23 and 24 to a loop including a high resistance $R_{s1}$ or $R_{s2}$ at a high speed.

Detection resistances $R_{s1}$ 28 and $R_{s2}$ 29 are connected with the coil in series when the N MOSes are turned on to amplify the voltage value induced by the oscillation of the rotor as shown in FIG. 6.

The pulse $P_s$ controls the operation of the amplifier as well as being applied to input terminals of the ANDs 36 and 37 to select one reference voltage. Accordingly the resistances $R_2$ and $R_3$ which establish and variably set the reference voltage are energized in synchronism with the amplification of the induced voltage.

Figure 9:
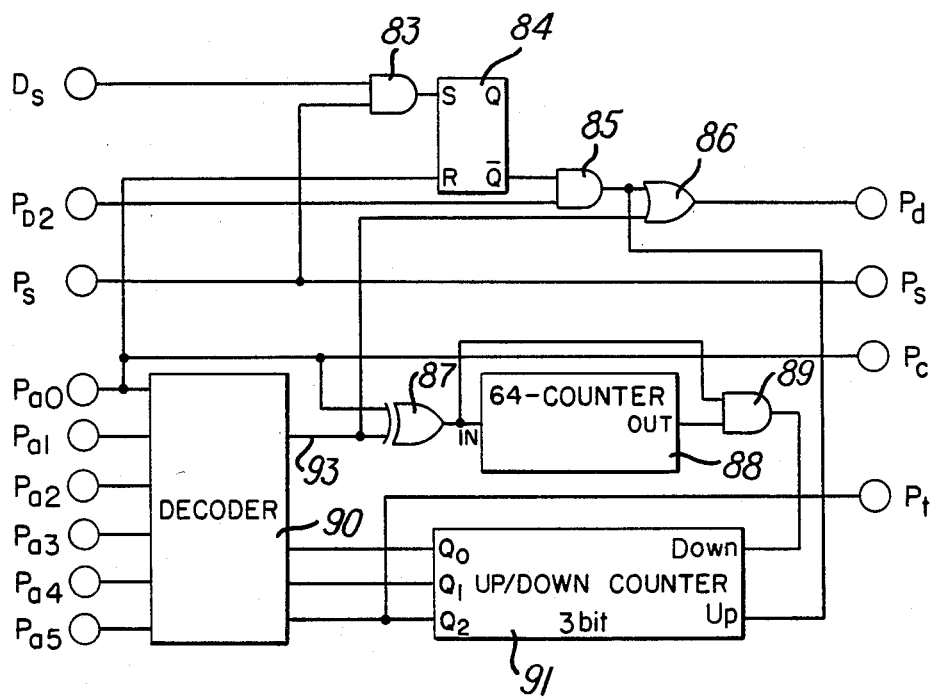
FIG. 9 shows a circuit diagram of a part of the control circuit.

FIG. 9 is a part of the control circuit 8 in the block diagram of FIG. 3. The overall control circuit is shown by joining FIG. 7 to FIG. 9.

Each pulse is applied to each terminal designated by the same marks in FIG. 8. The signals produced by the driver/detector circuit 9 are fed to the terminal $D_s$. The output terminals $P_s$, $P_c$ and $P_d$ are connected to the terminals designated by the same marks in FIG. 7.

The $P_t$ terminal is connected to the terminal designated by the same mark in the driver/detector circuit shown in FIG. 6. An FF84 is latched by the detection signal produced when the rotor has rotated to prohibit the correction pulse $P_{D2}$ to be produced.

An up-down counter 91 of 3 bits can memorize eight normal driving pulses. A decoder 90 produces one pulse selected from $P_{a0}$ to $P_{a5}$ on an output 93 as shown in TABLE 1 when an output from the up-down counter 91 is fed to the decoder 90.

TABLE 1

| $Q_0$ | 0 | 1 | 0 | 1 | 0 | 1 |
|---|---|---|---|---|---|---|
| $Q_1$ | 0 | 0 | 1 | 1 | 0 | 0 |
| $Q_2$ | 0 | 0 | 0 | 0 | 1 | 1 |
| Output 93 | $P_{a0}$ | $P_{a1}$ | $P_{a2}$ | $P_{a3}$ | $P_{a4}$ | $P_{a5}$ |

An output $Q_2$ is "1" only when the pulse $P_{a4}$ of 4.4 msec in width or the pulse $p_{a5}$ of 4.9 msec in width is selected. Therefore the output $Q_2$ is produced on the terminal $P_t$ as a signal to change over and variably set the reference voltage when driving pulses of more than 4 msec in width are selected.

Since a 64-counter 88 feeds down signals to the up-down counter 91 whenever the normal driving pulses are produced by 64 times, the pulse width of the normal driving pulses are shortened by 0.5 msec. If the rotor has not rotated on this occasion, the correction pulse $PD_2$ is produced and at the next step the normal driving pulse having the longer pulse width by 0.5 msec is produced. In this way the stepping motor is constantly driven by the minimum driving pulse width needed to effect rotation, and thereby the stepping motor is driven with an extremely small power.

As illustrated, the width of the normal driving pulses can be lengthened by setting more than two detection reference voltages according to the present invention. Consequently the stepping motor under large load variations can be drivin with extremely low power.

The present invention is available especially for wrist watches with calendar display which undergo large load variations.

I claim:

1. A driving device for a stepping motor having a rotor and driving coil comprising: driver/detector circuit means for detecting whether or not the rotor has rotated by comparing a voltage induced across the driving coil by the free oscillation of the rotor with a reference voltage after a driving pulse is cut off; and control circuit means for automatically changing the pulse width of the driving pulse in response to an output of said driver/detector circuit means, said control circuit means including means for lowering said reference voltage whenever the pulse width of the driving pulse is longer than a predetermined value thereby enabling the pulse width of the driving pulse to be changed over a wider range than would otherwise be possible if the reference voltage were maintained constant.

2. A driving device for driving a stepping motor having a stator, rotor and driving coil comprising: driver/detector circuit means receptive of a plurality of different driving pulses having different respective pulse widths for periodically applying one of the driving pulses to the driving coil to effect stepwise rotation of the rotor and for detecting rotation and non-rotation of the rotor by comparing the voltage induced in the driving coil by the free oscillation of the rotor which occurs after the driving pulse is cut off with a reference voltage and producing a corresponding output detection signal indicative of whether or not the rotor has rotated; and control circuit means for controlling which of the different driving pulses is applied to the driving coil in response to the output detection signal, the control circuit means including means for lowering the reference voltage whenever the pulse width of the applied driving pulse is longer than a predetermined pulse width.

3. A driving device according to claim 2; wherein the means for lowering the reference voltage comprises means for setting the reference voltage at a first value when the pulse width of the applied driving pulse is shorter than the predetermined pulse width and for setting the reference voltage at a second value which is lower than the first value when the pulse width of the applied driving pulse is longer than said predetermined pulse width.

4. A driving device according to claim 3; wherein the predetermined pulse width comprises about 4 msec.

5. A driving device according to claim 4; wherein the first value of the reference voltage is about 1 volt and the second value of the reference voltage is about 0.4 volt.

6. A driving device according to claim 3; wherein the first value of the reference voltage is about 1 volt and the second value of the reference voltage is about 0.4 volt.

7. A driving device according to claim 2; wherein the predetermined pulse width comprises about 4 msec.

* * * * *